(12) United States Patent
Hand et al.

(10) Patent No.: US 6,793,183 B1
(45) Date of Patent: Sep. 21, 2004

(54) INTEGRAL NODE TUBULAR SPACEFRAME

(75) Inventors: Michael L. Hand, Huntington Beach, CA (US); Edward E. Cook, Orange, CA (US); Samuel S. Yao, Fountain Valley, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/412,132

(22) Filed: Apr. 10, 2003

(51) Int. Cl.[7] ............................................. B64B 1/22
(52) U.S. Cl. ................................................ 244/158 R
(58) Field of Search ........................... 244/158 R, 119, 244/131; 264/257–270; 220/566, 584, 592, 62.19, 639–655

(56) References Cited

U.S. PATENT DOCUMENTS

| | | | | |
|---|---|---|---|---|
| 944,592 A | * | 12/1909 | Bonsall | 52/783.14 |
| 2,060,387 A | * | 11/1936 | Barnes | 244/119 |
| 2,157,042 A | * | 5/1939 | Barnes | 244/123 |
| 3,870,580 A | * | 3/1975 | Belcher | 156/181 |
| 3,940,891 A | * | 3/1976 | Slysh | 52/82 |
| 4,086,378 A | * | 4/1978 | Kam et al. | 428/34.5 |
| 4,125,979 A | * | 11/1978 | McLaughlin | 52/259 |
| 4,132,577 A | * | 1/1979 | Wintermantel | 156/156 |
| 4,259,821 A | * | 4/1981 | Bush | 52/309.1 |
| 4,452,657 A | * | 6/1984 | Hamm | 156/198 |
| 4,923,724 A | * | 5/1990 | Day et al. | 428/36.1 |
| 4,936,525 A | * | 6/1990 | Daffix et al. | 244/3.24 |
| 5,143,283 A | * | 9/1992 | Lancaster | 229/199 |
| 5,158,733 A | * | 10/1992 | Trimble | 264/258 |
| 5,223,067 A | * | 6/1993 | Hamamoto et al. | 156/173 |
| 5,242,523 A | * | 9/1993 | Willden et al. | 156/285 |
| 5,262,220 A | * | 11/1993 | Spriggs et al. | 428/156 |
| 5,376,207 A | * | 12/1994 | Pittman | 156/242 |
| 5,403,537 A | * | 4/1995 | Seal et al. | 264/511 |
| 5,474,262 A | * | 12/1995 | Fiore | 244/158 A |
| 5,803,402 A | * | 9/1998 | Krumweide et al. | 244/117 R |
| 6,050,315 A | * | 4/2000 | Deckers et al. | 156/433 |
| 6,114,012 A | * | 9/2000 | Amaoka et al. | 428/182 |
| 6,190,484 B1 | * | 2/2001 | Appa | 156/189 |
| 6,290,799 B1 | * | 9/2001 | Deckers et al. | 156/264 |
| 6,364,250 B1 | * | 4/2002 | Brinck et al. | 244/119 |
| 6,496,745 B1 | * | 12/2002 | Killian | 700/95 |
| 6,511,570 B2 | * | 1/2003 | Matsui | 156/245 |
| 6,684,593 B2 | * | 2/2004 | Brenneis et al. | 52/630 |

\* cited by examiner

*Primary Examiner*—Michael J. Carone
*Assistant Examiner*—Stephen Holzen
(74) *Attorney, Agent, or Firm*—Ingrassia Fisher & Lorenz, P.C.

(57) ABSTRACT

Methods and apparatus are provided for a tubular composite structure with particular application to the design and assembly of space vehicles. The apparatus, designated herein as an X-strut, comprises alternately crossing tow-placed layers of parallel strands of a composite material, to form top and bottom intersecting faces. Alternately crossing strand layers are built up from the bottom faces to form the side walls of the tubular composite structure. The top and bottom faces and the side walls are configured to form intersecting tubular members in an X-shape. The layers of strands run continuously through the intersecting tubular members to form an integral joint, without the need for adhesive bonding or mechanical fasteners.

7 Claims, 9 Drawing Sheets

INTEGRAL NODE TUBULAR SPACEFRAME

FIELD OF THE INVENTION

The present invention generally relates to the design and manufacture of spaceframe structures, and more particularly relates to the design and manufacture of upper stage intertank structures for space vehicles.

BACKGROUND OF THE INVENTION

Figure 1:
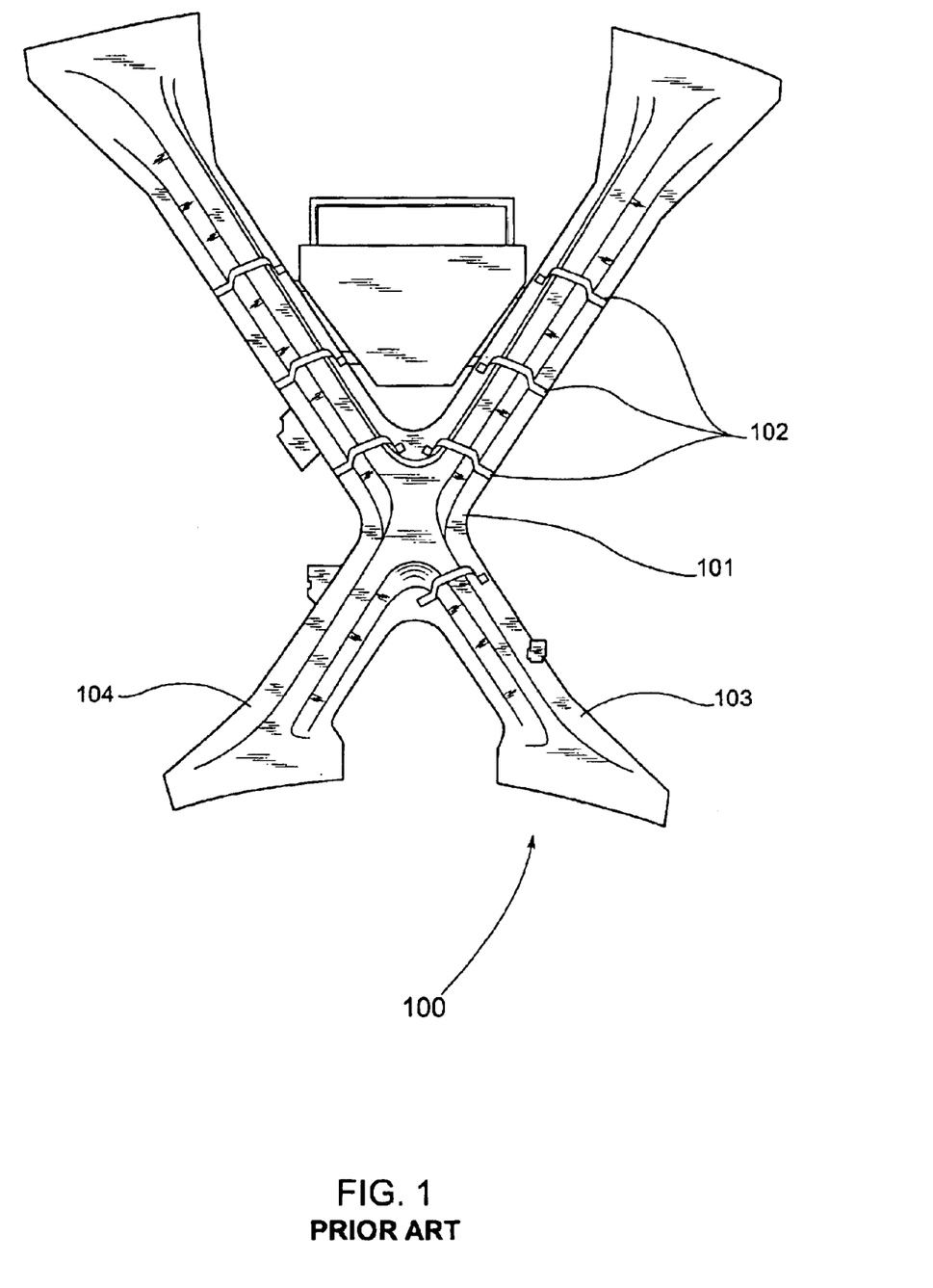
FIG. 1 depicts a prior art X-panel.

Prior art designs for certain structural components of space vehicles, such as the upper stage intertank structure of the Boeing Delta III and Delta IV launch vehicles, have been configured with X-shaped structural elements, referred to hereinafter as X-panels. One such X-panel 100 is shown in FIG. 1. This type of X-panel has been fabricated from either aluminum or a composite material, but studies have indicated that a composite material design allows meeting structural performance requirements with less weight and lower costs, in comparison to aluminum.

Figure 2:
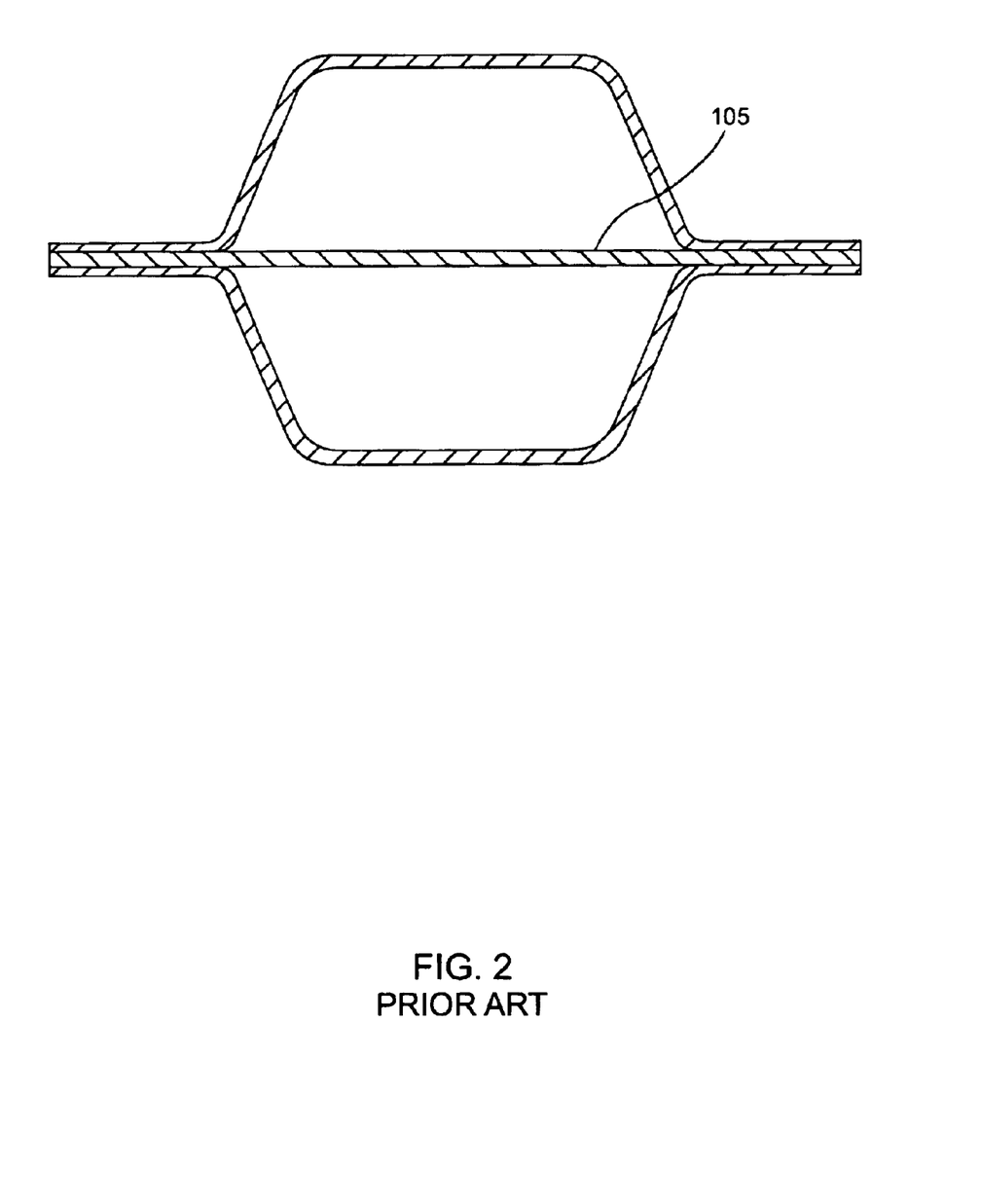
FIG. 2 illustrates the cross-section of a prior art X-panel.

An existing X-panel 100 generally incorporates two full-length adhesively bonded joints between two molded panel halves, plus numerous mechanical fasteners 102. As such, the X-panel design is labor-intensive, and relatively costly to manufacture. Moreover, the load path eccentricity 101 at the intersection of the two legs of the "X" (X-panel members 103, 104) typically requires local reinforcement with an associated weight penalty. In addition, the cross-section of the X-panel design, as shown in FIG. 2, frequently includes a central web 105, which also adds unwanted weight to the structure.

Accordingly, it is desirable to modify the design and fabrication of the aforementioned X-shaped structural element (X-panel 100) to reduce the associated labor and manufacturing costs, and to increase the structural efficiency of the intersection joint 101. In addition, it is desirable to modify the design of the X-panel 100 to reduce its weight contribution to the upper stage intertank, or any other structural component, of a space vehicle assembly. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for a tubular composite structure, which requires no adhesively bonded or mechanically fastened joints. The apparatus comprises intersecting tubular struts, each strut having a top face connected to a bottom face by side walls. The tows (bundles of reinforcing fibers) comprising the intersecting side walls of the struts are interwoven with each other to form a seamless integral joint between the struts. This technique can be used to form intersecting composite tubes of any cross sectional shape, and is not restricted to the rectangular cross sections shown in the accompanying drawings.

A method is provided for fabricating the tubular composite structure. The method comprises the following steps:

a) layering parallel strands of a composite material in an alternately crossing orientation to form intersecting bottom faces of the tubular composite structure;

b) building up from the intersecting bottom faces, strand layers of the composite material in an alternately crossing orientation to form intersecting side walls of the tubular composite structure;

c) layering parallel strands of the composite material in an alternately crossing orientation to form intersecting top faces of the tubular composite structure, the intersecting top faces corresponding to the configuration of the intersecting bottom faces and the intersecting side walls;

d) oven curing the composite material, using a combination of external and internal tooling to control the tube configuration during cross-linking of the composite matrix material;

wherein the layers of parallel strands forming intersecting bottom and intersecting top faces, and the layers of strands forming intersecting side walls, run continuously through the tubular composite structure to form a seamless integral intersection joint.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any theory presented in the preceding background of the invention or the following detailed description of the invention.

In order to achieve the desired objectives of decreased manufacturing costs and reduced weight of the prior art X-shaped structural element (X-panel 100), as well as reducing weight by increasing the structural efficiency of the intersection joint 101, a novel design approach has been applied to the fabrication technique of this element. For clarity, the inventive X-shaped structural element will hereinafter be referred to as an X-strut, to distinguish it from the prior art X-panel.

Figure 3:
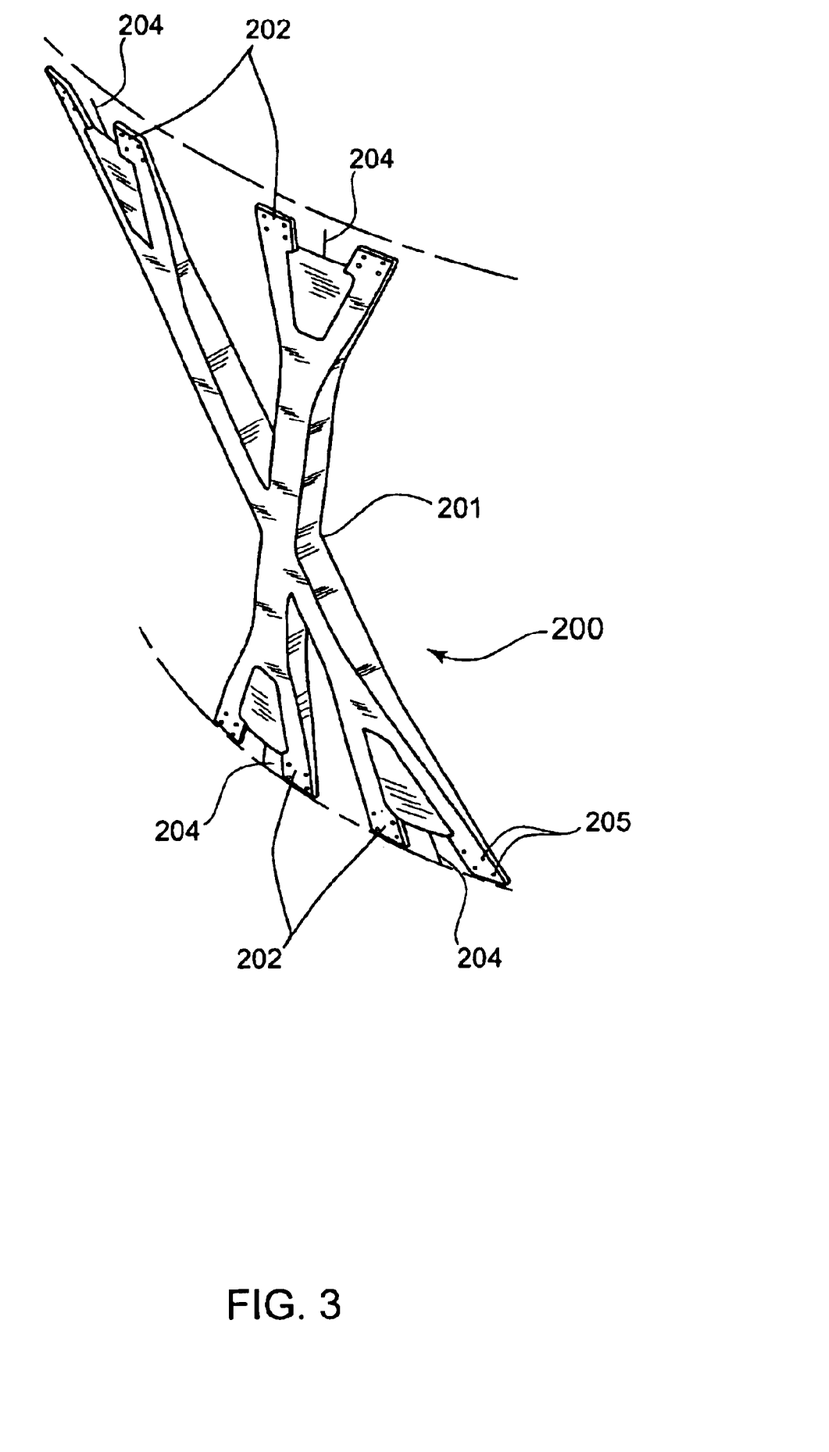
FIG. 3 is a depiction of an exemplary X-strut.

An exemplary embodiment of an X-strut 200 is shown in FIG. 3. The strut cross-section is in the form of a rectangular tube near the center 201, with flattened ends 202 to provide for single lap joints. Each leg is bifurcated to leave an opening 204 for withdrawing a tooling bladder (not shown). Holes 205, for shear joints between X-struts and intertank skirts (not shown), are drilled on assembly for maximum load carrying capability.

A process used for fabricating an exemplary X-strut 200 is based on the conventional "tow-placement" technique, which involves laying down strands of a composite material with a tow placement machine, such as the Viper Fiber Placement Systems, made by Cincinnati Machine. These strands (tows) are typically about ⅛ inch wide, and approximately 0.0055 to 0.011 inch thick. The tows can be reformed to different shapes and proportions during cure by the pressures applied by supporting tooling.

Figure 4:
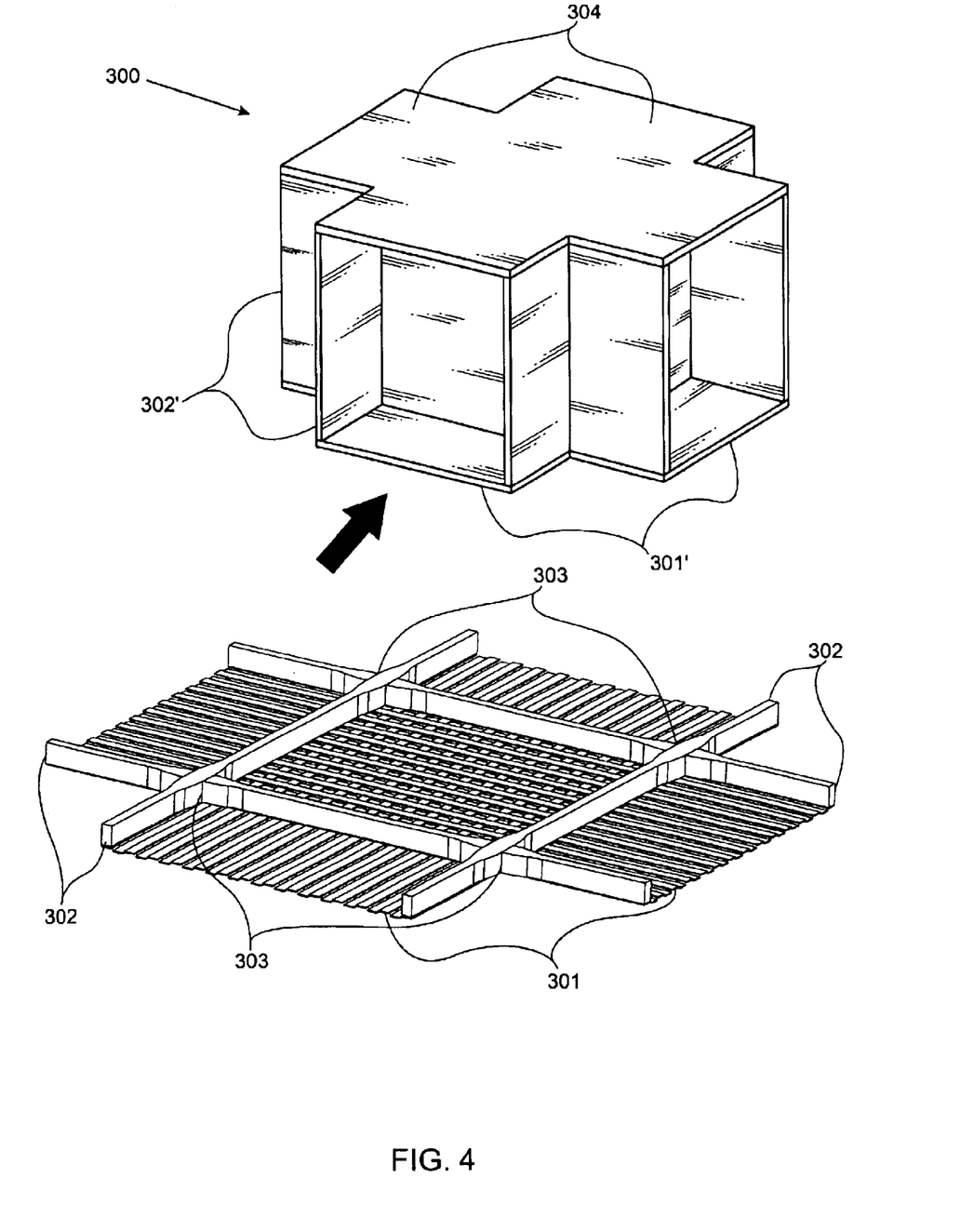
FIG. 4 shows an exemplary tow-placement process.

In an exemplary embodiment, as depicted in FIG. 4, parallel strands 301 of a composite material are tow-placed to form layers, in a crossing orientation, which become bottom tube faces 301'. Crossing strands 302 of the composite material are then alternately layered at the crossing intersections 303 to form intersecting tube sidewalls 302'. Finally, alternating layers of parallel strands are tow-placed on supporting tooling (not shown), to form the top tube faces 304.

The tow-placed bottom and top faces of parallel strand layers 301', 304 and the tow-placed strand layered side walls 302' are formed into intersecting tubes, with continuous fibers running through the intersection to form an integral joint 300. Importantly, this technique provides continuous load paths through the intersection 300 (equivalent to intersection 201 of X-strut 200), and eliminates the need for a bonded or mechanically fastened joint, as in the prior art X-panel 100. As such, the integral node X-strut intersection 201/300 has straighter load paths, allowing the applied load to be carried with less material than is required with the indirect load paths in the connected X-panel 100 joint 101.

When the X-strut 200 configuration is complete, the composite material is cured, using rigid external tooling in combination with internal tooling. In accordance with an exemplary embodiment, the external tooling comprises a two-part mold, which encloses the uncured X-strut and the internal tooling. The entire assembly is placed into an oven for the curing process. The internal tooling may be a removable type, such as an inflatable bladder, or may be a washout mandrel of a variety of materials. Additional internal tooling may be light enough to be left in place; e.g., tooling foam.

Figure 5:
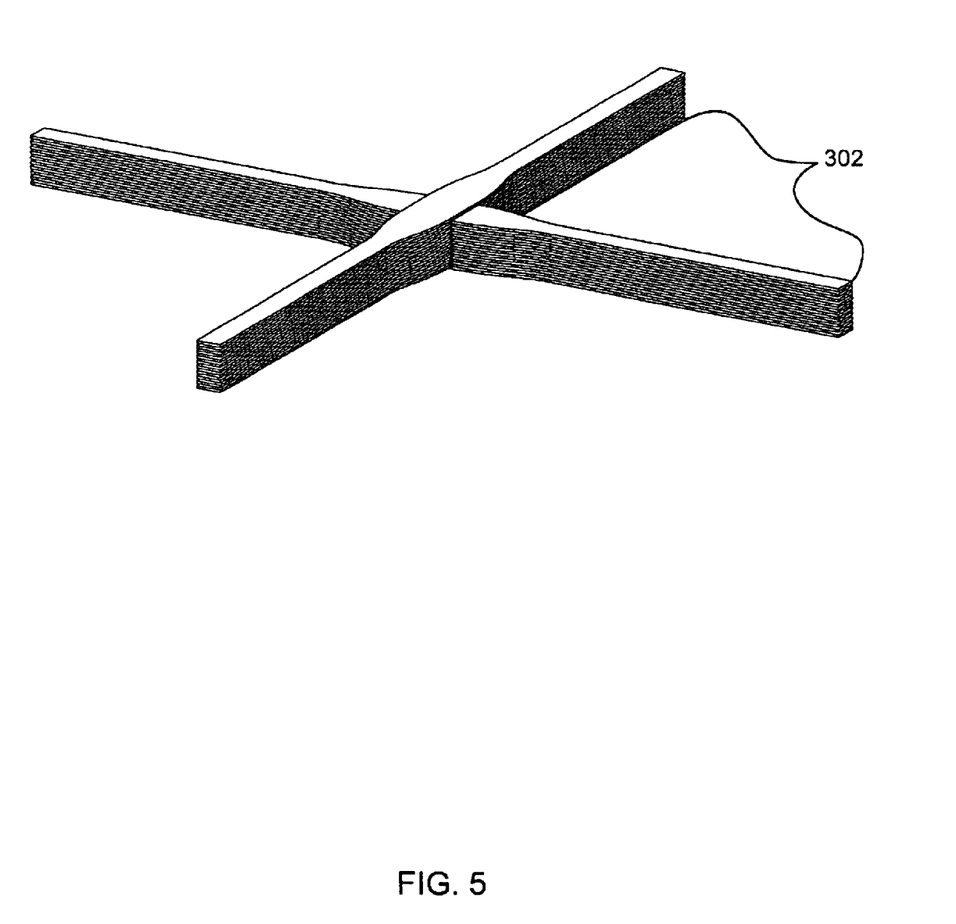
FIG. 5 is a sketch of crossing tows.
Figure 6:
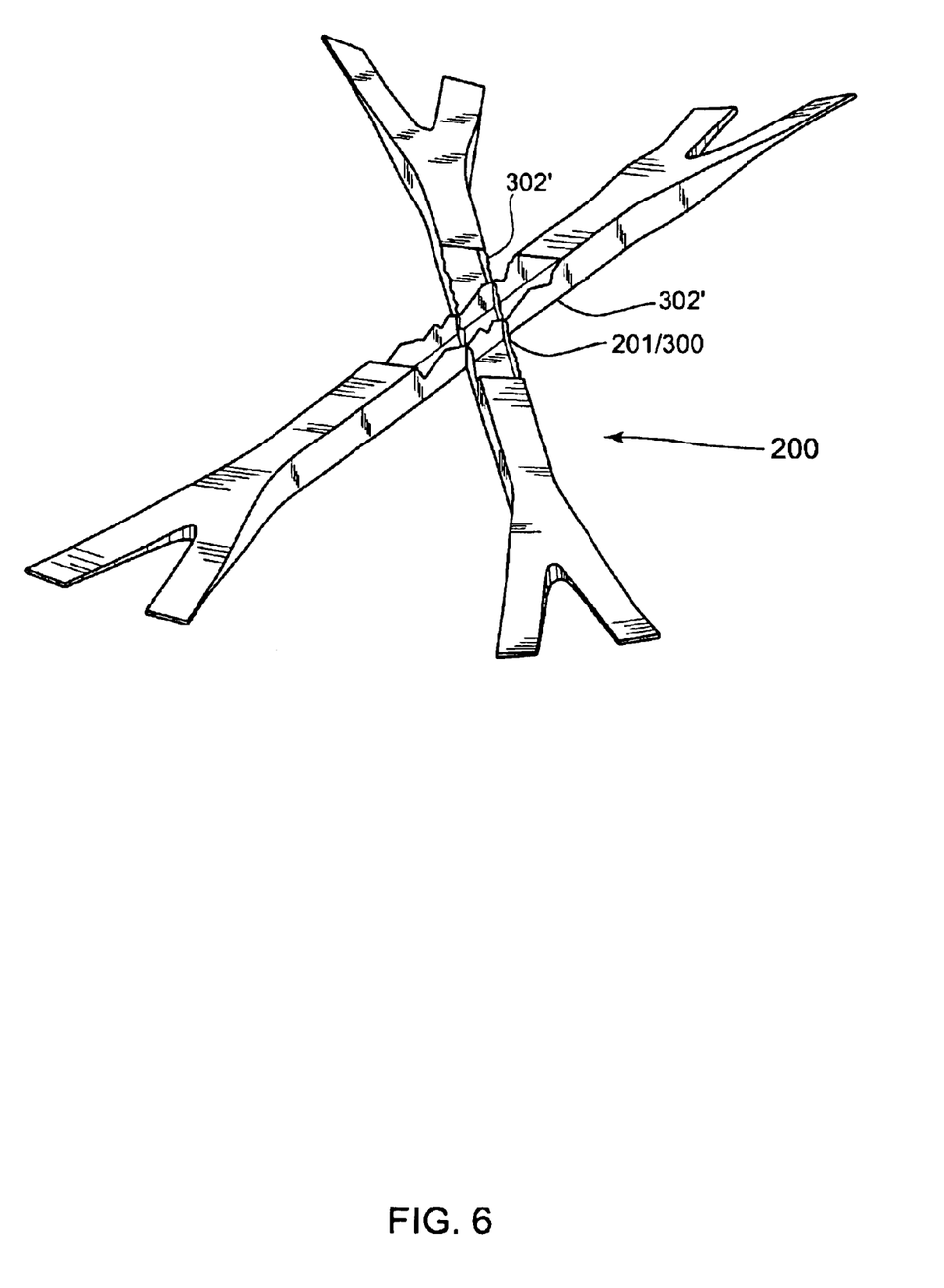
FIG. 6 is a cut-away of an X-strut intersection.
Figure 7:
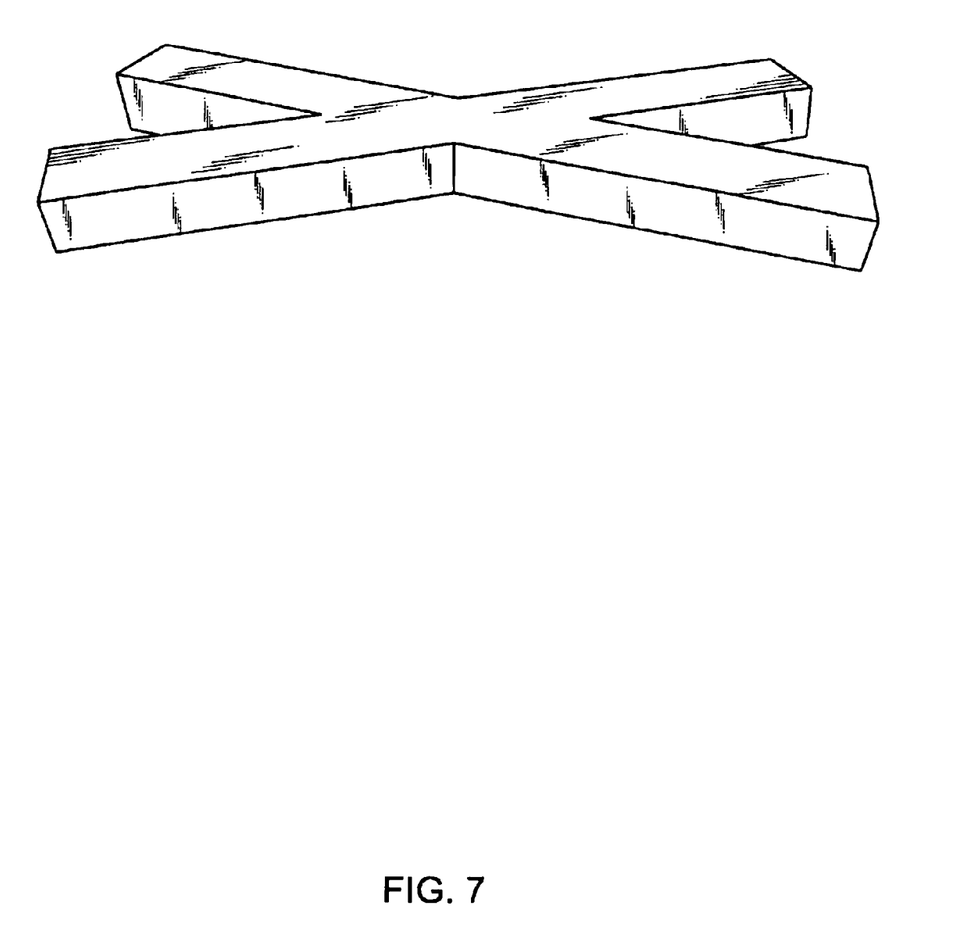
FIG. 7 is a perspective view of an exemplary prototype composite strut.

For further clarity, a more detailed sketch of crossing tows 302 is shown in FIG. 5, and a cut-away of the continuous load path intersection is shown in FIG. 6, with the side walls 302' intersecting at the center 201/300. The tooling for this process is specially designed to accommodate the tow spread at the crossing point 201/300, due to compaction. FIG. 7 is a perspective view of a prototype unitized composite strut, fabricated in accordance with the process described above.

An exemplary composite material for the X-strut 200 design is uniaxial IM7/977-2 graphite/epoxy prepreg tow. In one embodiment, this material is an intermediate modulus IM7 fiber in a highly oriented, 80% axial fiber layup in the X-strut 200, as contrasted to the typical hand layup of woven fabric, using G30-500 lower modulus fibers, in a quasi-isotropic layup in the prior art X-panel 100. Illustratively, an X-strut 200 design uses one ply of cloth in a +45 degree orientation, as the inner and outer ply of the layup. The remainder of the wall is tow-placed, with all tow-placed fibers being axial. The percentage of off-axis fibers can be controlled by appropriate selection of the fabric thickness. As an example, using readily available 0.011 in. thick fabric, the axial fiber volume fraction for an X-strut 200 cross-section might be approximately 75%.

The aforementioned material choices for the X-strut 200 design provide significant performance improvements over the prior art X-panel 100 design. Comparative analysis indicates that the X-strut 200 design increases axial specific stiffness by an approximate ratio of 1.9 to 1, and also increases the axial specific tensile strength by an approximate ratio of 3.5 to 1.

Figure 8:
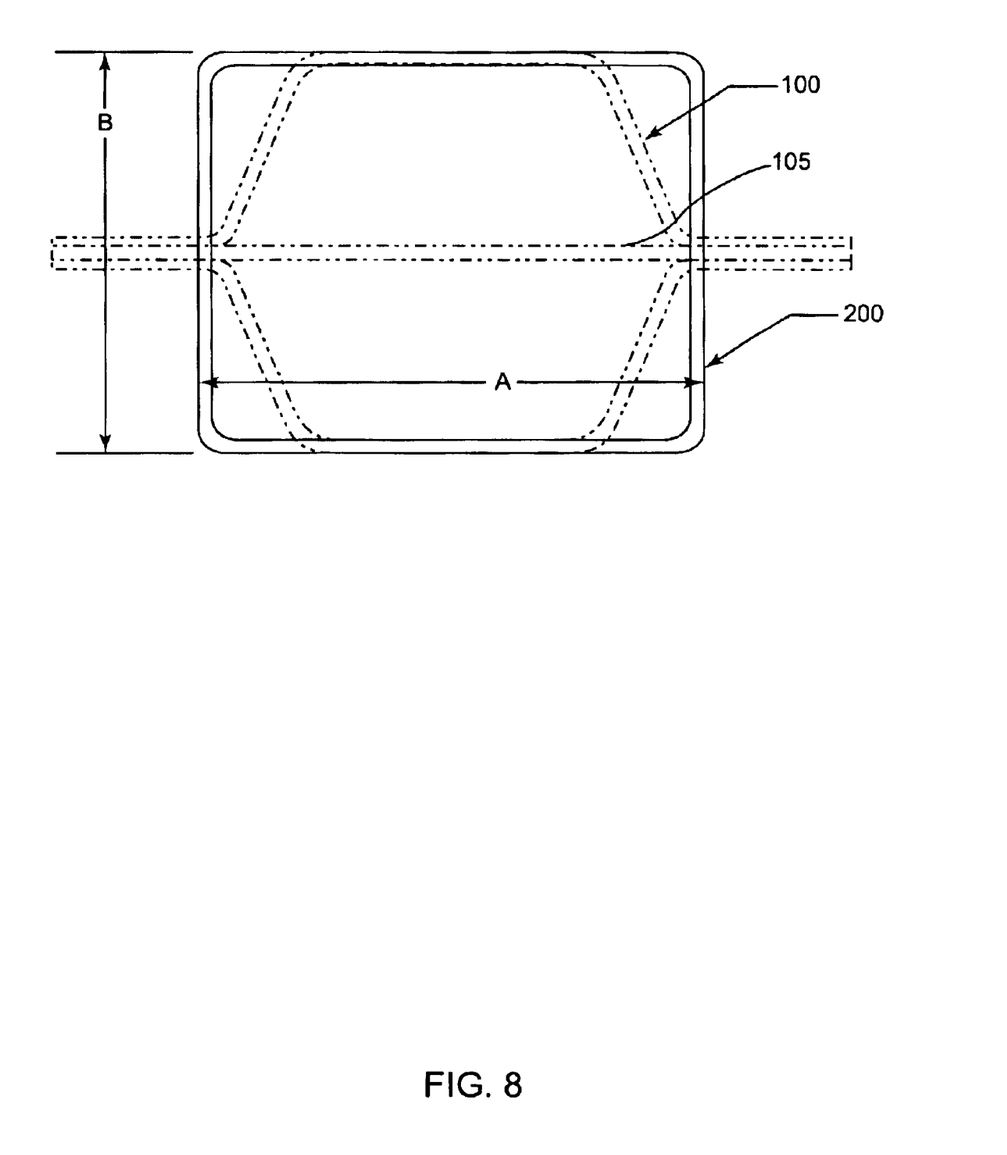
FIG. 8 shows a comparison between an exemplary X-panel cross-section and an exemplary X-strut cross-section.

In an exemplary embodiment, as shown in FIG. 8, the X-strut 200 cross-section is rectangular in shape, with approximate dimensions of A=4 to 5 inches, and B=4 to 4½ inches. The X-strut 200 design eliminates the central web 105 of the X-panel 100 design (see FIGS. 2 and 8), thus achieving a desired reduction in weight. Moreover, the X-strut 200 design can be implemented with automated material placement, and with no structural joints to assemble, as compared to the labor intensive hand layup, with two full length bonded joints, plus 36 anti-peel mechanical fasteners, of the X-panel 100 design. As such, the X-strut 200 design enables a significant reduction in manufacturing costs.

Figure 9:
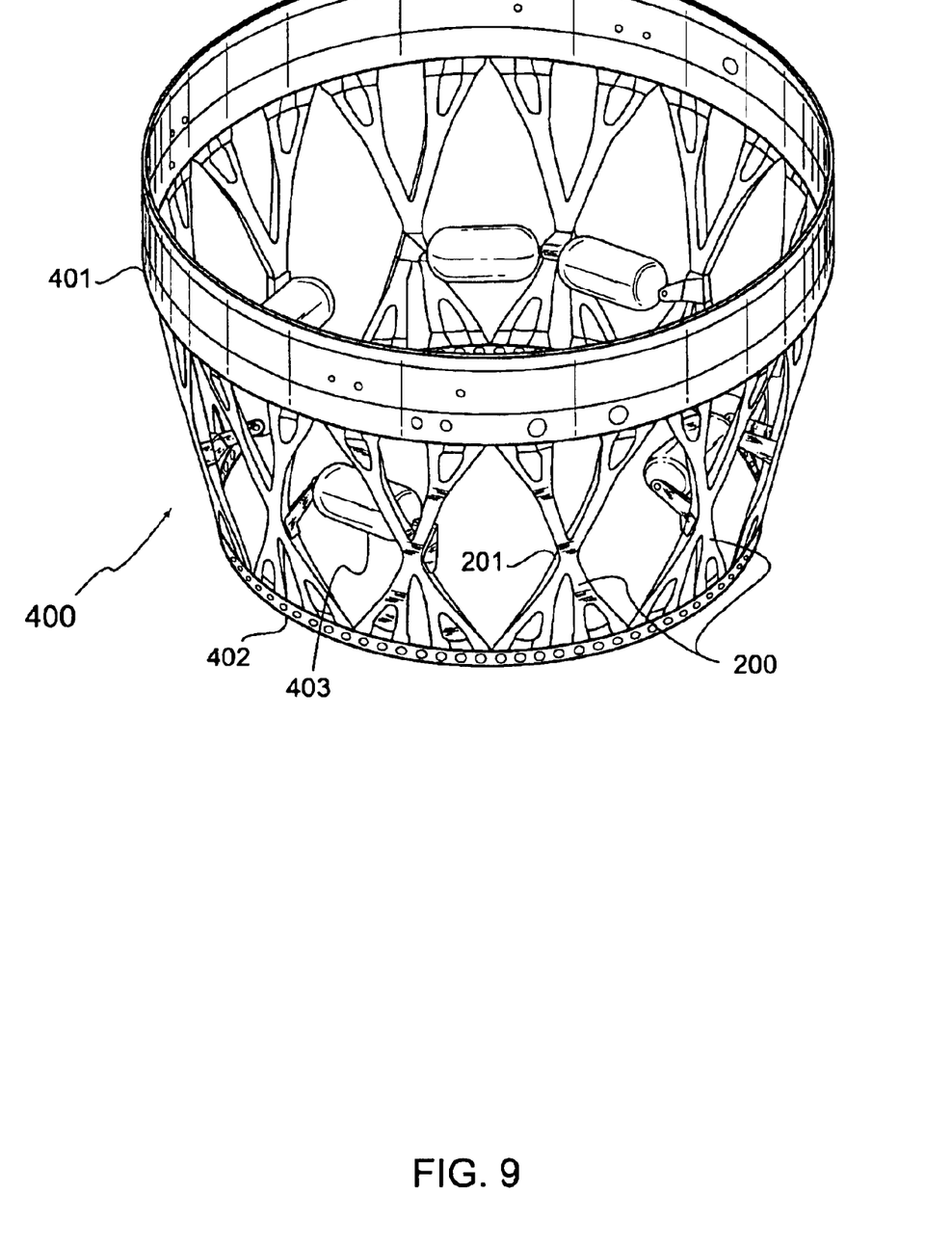
FIG. 9 illustrates an exemplary embodiment of an intertank structure incorporating X-struts.

FIG. 9 shows one implementation of an intertank structure 400, which incorporates the inventive X-strut 200 elements between a forward skirt 401 and an aft skirt 402. Also shown in FIG. 9 is an exemplary mounting arrangement of helium bottles 403, which are mounted to the X-struts 200 aft of the strut intersection. While this embodiment includes twelve X-struts, each having a single intersection 201, alternate embodiments may vary the number of X-struts, as well as extending the concept to tubular space-frame elements with multiple intersections.

To summarize, the inventive X-strut 200 design described herein achieves the desired objectives of weight reduction and decreased manufacturing costs. In fact, current estimates indicate the X-strut 200 design to be on the order of 26% lighter and 46% less expensive than a corresponding X-panel 100 design. Moreover, the X-strut 200 design permits the assembly of intersecting beam columns without a discrete joint. Using the continuous fiber technique described above, the structural elements "flow" into each other, and no bonds or fasteners are required.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An integral node tubular structure of a composite material, comprising:

a first tubular strut having a first top face and a first bottom face connected by first sidewalls;

a second tubular strut having a second top face and a second bottom face connected by second side walls; and an intersection between the first and second tubular struts, wherein the first bottom face inks with the second bottom face, the first top face intersects with the second top face, and the first and second intersecting side walls are interwoven with each other to form a seamless integral node between the first and second struts.

2. The tubular structure of claim 1 wherein the intersecting tubular struts form a single intersection X-shape.

3. The tubular structure of claim 1 wherein the intersecting tubular struts form a multiple intersection structure.

4. The tubular structure of claim 1 wherein the composite material is an intermediate modulus IM7 fiber in a highly oriented, 80% axial fiber layup.

5. The tubular structure of claim 1 wherein the composite material is a uniaxial IM7/977-2 graphite/epoxy prepreg tow.

6. The tubular structure of claim 1 wherein the composite material comprises strands that are each ⅛ inch wide, and within the range of 0.0055 to 0.011 inch thick.

7. The tubular structure of claim 1 wherein a plurality of the intersecting tubular struts are assembled within an intertank structure for a space vehicle.

* * * * *

UNITED STATES PATENT AND TRADEMARK OFFICE
CERTIFICATE OF CORRECTION

PATENT NO. : 6,793,183 B1  
DATED : September 21, 2004  
INVENTOR(S) : Michael L. Hand et al.

Page 1 of 1

It is certified that error appears in the above-identified patent and that said Letters Patent is hereby corrected as shown below:

Column 4,  
Line 61, delete "inks" and add -- intersects --.

Signed and Sealed this

Twenty-first Day of December, 2004

JON W. DUDAS  
*Director of the United States Patent and Trademark Office*